United States Patent [19]

Bhatti

[11] Patent Number: 4,627,864
[45] Date of Patent: Dec. 9, 1986

[54] METHOD OF MAKING GLASS FIBER FORMING FEEDERS

[75] Inventor: Mohinder S. Bhatti, Granville, Ohio

[73] Assignee: Owens-Corning Fiberglas Corporation, Toledo, Ohio

[21] Appl. No.: 639,177

[22] Filed: Aug. 9, 1984

[51] Int. Cl.⁴ .................. C03B 37/08; B23K 35/24
[52] U.S. Cl. .......................................... 65/1; 228/243;
228/263.19; 264/500; 264/507; 419/68;
425/405 H
[58] Field of Search ...................... 65/1; 228/242, 243,
228/263.19; 156/272.2; 425/405 H; 419/49, 68;
264/500, 507

[56] References Cited

U.S. PATENT DOCUMENTS 3,829,261 8/1974 Larsson ................. 425/405 H X
4,068,704 1/1978 Wittmoser ............. 425/405 H X
4,264,556 4/1981 Kumar et al. .......... 425/405 H X
4,342,578 8/1982 Bhatti et al. ................... 65/1

Primary Examiner—Robert Lindsay
Attorney, Agent, or Firm—Ronald C. Hudgens; Robert F. Rywalski; Greg Dziegielewski

[57] ABSTRACT

A method of making an orificed discharge wall for supplying a plurality of streams of molten glass to be attenuated into filaments is provided comprising inserting elements in apertures in a member; positioning said elements and member within a thin walled elastomeric sheath adapted to isostatically transmit pressure to said elements and member; applying isostatic pressure to the sheathed elements and member to mechanically seal the elements to the member; and fusing the mechanically sealed elements and member together to prevent the unwanted passage of molten glass between said elements and said member, said elements having an orifice to permit the passage of molten glass therethrough to establish said streams.

9 Claims, 2 Drawing Figures

METHOD OF MAKING GLASS FIBER FORMING FEEDERS

TECHNICAL FIELD

The invention disclosed herein relates to the production of glass fibers and glass fiber forming feeders.

BACKGROUND ART

With the production of glass fiber forming feeders having an ever-increasing number of orifices or tips to supply the streams of molten material to be attenuated into filaments, the need for effective and efficient systems for attaching the orificed tips or elements in the apertures in the discharge wall has also increased. Previously the individual projections or tips were welded to the discharge wall by conventional welding techniques, such as cold resistance welding, electron beam welding, laser welding and the like. In essence, each of these systems welded a single tip at a time. With fiber forming feeders having as many as 4,000 or more tips, the welding process can be quite time consuming. Further, there are other problems associated with the systems which are well known in the art.

DISCLOSURE OF THE INVENTION

This invention pertains to a method of making an orificed discharge wall for supplying a plurality of streams of molten inorganic material to be attenuated into filaments comprising: inserting elements in apertures in a member; positioning said elements and member within a thin walled elastomeric sheath adapted to isostatically transmit pressure to said member and elements; applying isostatic pressure to the sheathed elements and member to mechanically join or attach the elements to the member; and fusing the elements to the member to prevent the unwanted passage of molten glass between said elements and said member, said elements having an orifice to permit the passage of molten glass therethrough to establish said streams.

BEST MODE OF CARRYING OUT THE INVENTION

Figure 1:
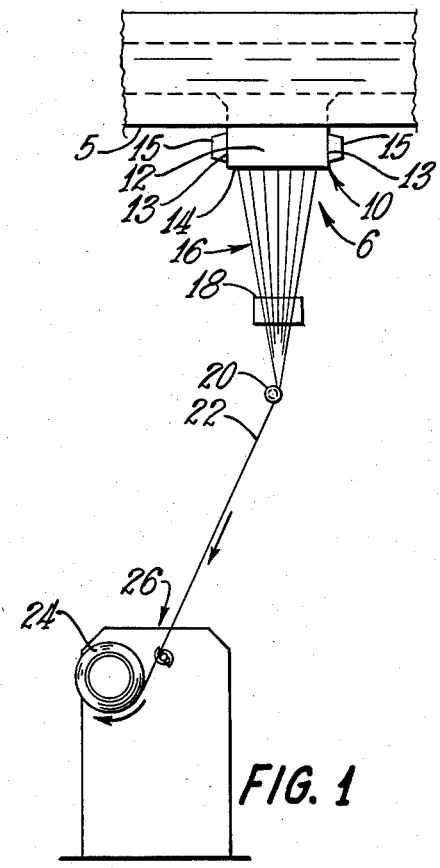
FIG. 1 is a semi-schematic front elevational view of a glass textile type fiber forming system.

As shown in FIG. 1, feeder 10, which is comprised of an orificed bottom or discharge wall 14 and other sections such as containment or sidewalls 12 and end walls 13, is adapted to provide a plurality of streams of molten inorganic material, such as glass, through a plurality of orificed elements 85. Feeder 10, including discharge wall 14, is electrically energized via terminals 15 joined to a suitable source of electrical energy (not shown) to heat the glass therein as is known in the art. As shown, terminals 15 are joined to end walls 13, but terminals 15 may extend outwardly from bottom wall 14, if desired. The streams of molten glass can be attenuated into filaments 16 through the action of winder 26 or any other suitable means.

As is known in the art, size applicator means 18 provides a coating or sizing material to the surface of the glass filaments which advance to gathering shoe or means 20 to be collected as an advancing strand or bundle 22. Strand 22 is then wound into package 24 upon a collet of winder 26 as is known in the art. Thus, FIG. 1 schematically represents a "textile" fiber forming system.

Member 69 may be comprised entirely of any suitable material, such as a platinum and rhodium alloy which, for example, is well known in the art. Or, member 69 may be based upon a laminate comprised of a refractory metal core having an oxygen impervious, precious metal sheath formed by hot isostatic pressing (i.e., HIP) as is disclosed in U.S. Pat. Nos. 4,342,577, 4,348,216, 4,343,636 or 4,404,009, for example.

Figure 2:
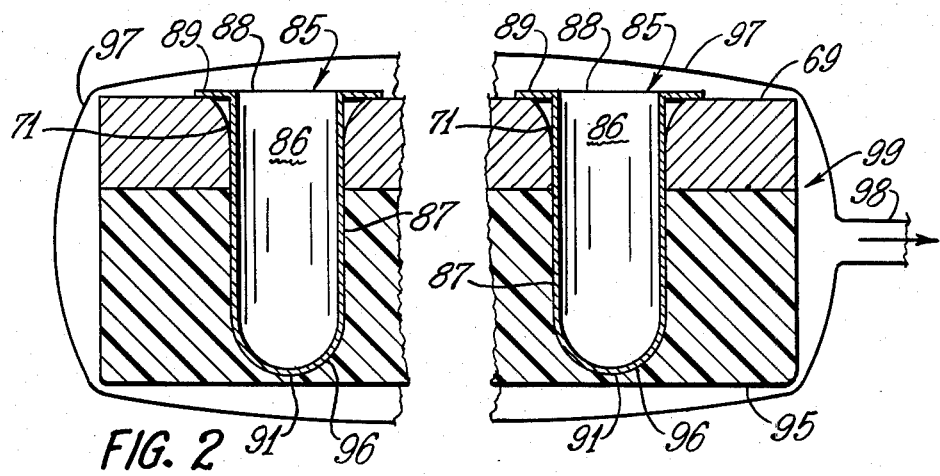
FIG. 2 is an enlarged cross-sectional view of the discharge wall of the feeder shown in FIG. 1 during fabrication according to the principles of this invention.

FIG. 2 depicts a portion of a discharge wall at a point during fabrication according to the principles of this invention. As such, elements or tips 85 are positioned in apertures 71 in member 69. In abutting engagement with one side of member 69, a support body 95 having a plurality of recesses 96 oriented to receive the projecting portions of elements 85 may be employed to prevent sheath or membrane 97 from rupturing over the projecting ends 91 of elements 85 during pressing.

Preferably, support body 95 is made from any suitable firm but elastomeric compound such as a polyvinyl chloride (PVC) or a urethane. However, support bodies may be fabricated from other materials such as wood or metal. Generally, support body is sufficiently rigid to preclude transmission of the hydraulic pressure in an isostatic manner to the "bottom" side of member 69, that is, the side of member 69 in contact with support body 95, as well as the exterior of sleeve 87 projecting from member 69. As such, pressure is isostatically applied to the flange 89, the interior of sleeve 87, and the side of member 69 in contact with flange 89, that is, the side of member 69 not in contact with support body 95. Desirably, the material of support body 95 should not bond to the elements 85 or member 69 during pressing.

The assembly 99 of support body 95, member 69 and elements 85 located within a precured, elastomeric sheath or balloon 97 which is preferably a relatively thin walled, natural or synthetic rubber. The sheathing material 97 must be capable of isostatically transmitting fluidic pressure to member 69 and elements 85 and must prevent the migration of the working fluid such as "oil" in a cold isostatic pressing unit, between the mating surfaces of member 69 and elements 85.

With assembly 99 positioned in the elastomeric tube or balloon 97, the balloon 97 is connected to a source of vacuum to evacuate or withdraw the gas or atmosphere from the interior thereof to facilitate the mechanical bonding of elements 85 to member 69.

Once a sufficient vacuum is drawn within sheath 97 through opening or collar 98, opening 98 is sealed by any suitable means, such as an adhesive and/or plug, to maintain the evacuated state. The evacuated sheath 97 containing assembly 99 is then ready to be isostatically pressed to mechanically bond the elements 85 to member 69.

After cold isostatic pressing, the mechanically bonded elements 85 and member 69 may be heated, such as a furnace, to fuse the elements 85 to member 69 to prevent the unwanted passage of molten glass therebetween as set forth in U.S. Pat. No. 4,447,248, issued on May 8, 1984 to me. Or, member 69, having elements 85 mechanically bonded thereto, may be joined to the remaining sections to form feeder 10, which is subsequently electrically energized to resistively heat feeder 10 including member 69 to fuse elements 85 thereto, in situ, as set forth in U.S. Pat. No. 4,441,904, issued on Apr. 10, 1984 to me.

A glass fiber forming feeder 10 discharge wall 14 was fabricated from a platinum-rhodium alloy plate or member 69 and a plurality of platinum-rhodium alloy elements or tips 85. As such, member 69 contained a plurality of apertures 71 which each received an element 85. Each of the elements or tips 85 were comprised of a sleeve 87 and a flange 89. An orifice 86 within sleeve 87 extended from first end 88 at flange 89 to a second end 91 along sleeve 87. As shown in FIG. 2, second end 91 was closed. However, it is to be understood that tips 85 may be supplied with an open second end 91 such that orifice 86 extends completely through element 85.

The elements 85 were inserted into apertures 71 of member 69 such that flange 89 was in abutting engagement with one side of member 69 and such that a portion of sleeve 87, including second end 91, extended beyond the opposite side of member 69.

A support body 95 of precured, plasticized PVC having recesses 96 therein was positioned over the protruding portion of elements 85 such that body 95 was in abutting engagement with member 69 with sleeves 87 in recesses 96 to form an assembly 99.

Assembly 99 was positioned in a balloon-like synthetic rubber (neoprene) sheath 97 having a wall thickness from about 0.015 inches to about 0.020 inches and a vacuum drawn therein. After drawing the vacuum within sheath 97, collar or opening 98 was sealed to retain the vacuum.

The sealed, evacuated unit was then placed in the oil bath of a cold isostatic pressing (CIP) unit, and a pressure of about 150,000 psi was exerted on the unit to mechanically seal or join elements 85 to member 69. Since cold isostatic pressing was employed, the operation was carried forth at approximately room temperature.

The elastomeric sheath 97 should be sufficiently elastic and thin to permit sheath 97 to be elastically deformed or stretched into the orifices 86 of elements 85 so that the hydraulic pressure of the working fluid of the CIPing unit is applied radially outward from within sleeve 87 of element 85 as well as against the flat of flange 89 to force flange 89 of element 85 into member 69.

In some instances, pinhole perforations may occur in sheath 97 at the apex of the deformation into sleeve 87. This is not necessarily fatal to the system since the pressure applied by the oil bath of the CIPing unit tends to seal the sheath 97 against sleeve 87 sufficient to prevent the migration of the working fluid of the CIPing unit between element 85 and member 69.

Subsequent to the application of isostatic pressure in the CIP unit, the elastomeric sheath 97 and support body 97 were removed from mechanically joined member 69 and elements 85. The second ends 91 of elements 85 were then machined to open orifice 86 to permit the passage of molten glass therethrough.

Then the un-fused discharge wall sub-assembly, comprised of the mechanically sealed elements and member 69, was suitably joined to sidewalls 12 and end walls 13 to form feeder 10. Subsequently, feeder 10 was positioned beneath a supply of molten glass, a forehearth, as is known in the art. That is, feeder 10 was installed in the refractory 5 of a fiber forming position 6 so that molten glass can be supplied to feeder 10 for attenuation into filament 16. Then electrical power was supplied to gradually raise the temperature of feeder 10 to the desired level as is done with conventionally fabricated feeders. As such, upon electrically energizing feeder 10, and thus member 69, members 85 are fused to member 69 at flange 89 and sleeve 87.

Preferably, the material of tips or element 85 has a coefficient of expansion greater than that of member 69. As such, upon heating or energization of feeder 10, sleeves 87 of elements 85 tend to expand more than the internal diameter of the apertures 71 of member 69 such that sleeve 87 is even more intimately pressed into the portion of member 69 to defining aperture 71.

In the foregoing example, the elements 85 were comprised of H alloy (an alloy of 90% platinum and 10% rhodium) while the member 69 was comprised of J alloy (an alloy of 75% platinum and 25% rhodium). With regard to some alloys, such as J alloy, it may be desirable to anneal the sections (i.e., member 69 and/or elements 85) prior to CIPing, since work hardened J alloy may require excessive pressures to be employed before acceptable mechanical joining occurs.

To provide an effective mechanical seal between the elements and member in the isostatic pressing step, it is preferred that the isostatic pressure applied be greater than or equal to the yield point of the material of the elements 85 at the temperature employed for the pressing step.

It has been found that operating the cold isostatic pressing unit at pressures from about 125,000 to 150,000 psi for approximately 5 minutes is suitable for H alloy as well as J alloy in the annealed condition.

If member 69 is comprised of a laminate having a refractory metal core as disclosed herein, feeder 10 is preferably surrounded in an inert gas, such as nitrogen, to prevent the oxygen containing atmosphere from oxidizing the refractory metal core prior to the fusion of the precious metal element 85 to the exterior precious metal. According to the foregoing procedures, if a tip 85, as shown in FIG. 2, is employed, the flange 89 will be fused to one surface of member 69, and sleeve 87 will be fused to the portion of member 69 defining the apertures 71 associated therewith. Further, if the refractory metal/precious metal laminate is employed as member 69, the sleeve of element 85 will fuse to the refractory core and precious metal layers to seal the refractory metal within a protective layer of oxygen impervious, precious metal to prevent the oxidation of the refractory metal at elevated temperatures.

Also, it is to be understood that element 85 may be of any suitable shape, and, in particular, flange 89 may be dispensed with and/or the length of sleeve 87 may also be substantially equal to the thickness of member 69 to provide a tipless orifice plate having orifices lined with a suitable material fused to the member 69.

Also, it is to be understood that support body 95 may not be necessary in the practice of the instant invention. For example, with an assembly 99 having relatively short sections of sleeve 87 projecting outwardly therefrom, the elasticity of sheath 97 may be sufficient to stretch over sleeves 87 without rupturing during the CIP'ing step. As such, support body 95 is optional.

Consistent with the disclosures of the patents referenced herein, the present invention may also find utility in fabricating rotary type fiber-forming feeders as well as the stationary "textile" type shown in FIG. 1.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention disclosed herein is readily applicable to the formation of continuous and/or staple glass filaments.

I claim:

1. A method of making an orificed discharge wall for supplying a plurality of streams of molten inorganic material to be attenuated into filaments comprising:
   inserting elements in apertures in a member;
   positioning said elements and member within a pre-cured elastomeric sheath adapted to isostatically transmit pressure to said elements and member;
   applying cold isostatic pressure to the sheathed elements and member to mechanically seal the elements to the member; and
   fusing the mechanically sealed elements and member together to prevent the unwanted passage of molten glass between said elements and said member, said elements having an orifice to permit the passage of molten glass therethrough to establish said streams.

2. The method of claim 1 wherein the pressure is applied approximately at room temperature and the pressure is greater than or equal to the yield point of the material of the elements at such temperature.

3. The method of claim 2 wherein the sheathing material is natural or synthetic rubber.

4. The method of claim 3 wherein the sheath has a wall thickness from about 0.015 inches to 0.020 inches thick.

5. The method of claim 1 further comprising: applying a vacuum to said sheath containing said member and elements and sealing said sheath to maintain said vacuum within said sheath.

6. The method of claim 1 wherein said fusion step is effected by heating the mechanically sealed elements and member prior to joining said discharge wall to other sections of the feeder.

7. The method of claim 1 wherein said fusing step is effected by joining the pressed member and elements to sections to form said feeder; installing said feeder at a fiber forming position to receive molten glass; and then energizing the feeder to fuse the elements to the member.

8. The method of claim 1 wherein said inorganic material is glass.

9. The method of claim 1 wherein said elements have a sleeve projecting beyond said member and isostatic pressure is not applied to the exterior of said sleeves.

* * * * *